(12) United States Patent
Li (10) Patent No.: US 8,292,349 B1
(45) Date of Patent: Oct. 23, 2012

(54) LONGITUDINAL-SLIDE DOOR CONTROLLING MECHANISM

(75) Inventor: Chih-Hung Li, Xindian (TW)

(73) Assignees: Ying-Chieg Wang, Taoyuan County (TW); Chih-Hung Li, Taipei County (TW)

( * ) Notice: Subject to any disclaimer, the term of this patent is extended or adjusted under 35 U.S.C. 154(b) by 0 days.

(21) Appl. No.: 13/103,731

(22) Filed: May 9, 2011

(51) Int. Cl.
*B60J 5/06* (2006.01)
(52) U.S. Cl. .......................................... 296/155; 49/360
(58) Field of Classification Search .................. 296/155; 49/360
See application file for complete search history.

(56) References Cited

U.S. PATENT DOCUMENTS

| | | | |
|---|---|---|---|
| 7,111,895 B2* | 9/2006 | Rivers et al. | 296/155 |
| 7,963,587 B2* | 6/2011 | Thiele et al. | 296/155 |
| 2004/0070231 A1* | 4/2004 | Yogo et al. | 296/155 |

* cited by examiner

*Primary Examiner* — Joseph Pape (57) ABSTRACT

A longitudinal-slide door controlling mechanism is provided to improve door controlling for large vehicles, such as buses. The door controlling mechanism is designed to longitudinal-slide to save space-occupied by the door and enhance safety. The mechanism includes a track, a slider group, a flexible transmission group, and a drive element. The flexible transmission group is used to drive the slider group to move along the track. And the track is attached to the bus body. Therefore the bus door is driven to longitudinal-slide along the bus body. The space-occupied caused by the conventional rotary door is saved. Also, the passerby struck by the door during opening would be eliminated.

15 Claims, 8 Drawing Sheets

LONGITUDINAL-SLIDE DOOR CONTROLLING MECHANISM

BACKGROUND OF THE INVENTION

1. Field of the Invention

The present invention relates to a door controlling mechanism, and more particularly but not by any way of limitation, to a longitudinal-slide door controlling mechanism adapted for large vehicles, such as buses, to save space-occupied caused by the conventional rotary door and to eliminate the passerby-struck during opening.

2. Related Art

A bus is a road vehicle designed to carry passengers. Buses have a capacity as high as 300 passengers. The most common type of bus is the single-decker bus, with larger loads carried by double-decker buses and articulated buses, and smaller loads carried by midibuses and minibuses; coaches are used for longer distance services. Buses may be used for scheduled bus transport, scheduled coach transport, school transport, private hire, tourism; promotional buses may be used for political campaigns and others are privately operated for a wide range of purposes.

As is generally well known in the art, a rotary door mainly used in the buses. These rotary doors are available in two distinct types, commonly referred to as zero-lead and lift-and-lock. Either door operator type can be adapted for use with pneumatic or hydraulic fluids. Both rotary door types have a double acting cylinder typically attached to a flanged mounting bracket. The mounting bracket has an aperture for an output shaft which is attached at one end to the piston disposed with the double acting cylinder and coupled with a door post at a distal end. A cover is generally provided for encasing the double acting cylinder as well as any other rotary door operator components attached either to the double acting cylinder or to the mounting bracket.

When the rotary is operated to open, the door is rotated. If the operator, such as the bus drivers, is careless, the rotating door may strike passerby, bikes, cars or objects on the roadside. The passerby may be injured. The bikes, cars or the doors would be damaged. Also, when the door is completely opened, the door is moved to one side of the entrance. Part of the space of the entrance is occupied by the door. Therefore, the entrance has to be larger to make enough space for the passengers. The space-used in the car would be decreased.

SUMMARY OF THE INVENTION

To solve the aforementioned problems of the prior art, the present invention provides a longitudinal-slide door controlling mechanism adapted for large vehicles, such as buses. The door controlling mechanism is utilized to control to open/close the door of the bus. When the door is closed, the bus body has smooth appearance, and when opening, the door is driven along to the bus body to longitudinal-slide open. Therefore, the space-occupied caused by the conventional rotary door is saved. Also, the passerby struck by the door during opening would be eliminated.

Accordingly, the present invention discloses a longitudinal-slide door controlling mechanism. The door controlling mechanism includes a track, a slider group, a flexible transmission group and a drive element. The track is mounted on a bus body of the bus and near the door. The track includes a curved front section and a rear section being substantially parallel to bus body. The flexible transmission group is installed to the rear section of the track. The slider group includes a fixing element, a connecting element and a guiding element. The connecting element is pivotally connected to the fixing element and a guiding element. Also the fixing element is connected to the door and the guiding element is attached to the flexible transmission group. The drive element drives the flexible transmission group to move to make the door longitudinal-slide open/close along to the track by slider group.

When the door is closed, the bus body has smooth appearance due to the curved front section of the track, and when the drive element drives the flexible transmission group to move the slider group, the door is driven along to the track to longitudinal-slide open.

Moreover, the flexible transmission group includes an active pulley, at least two secondary pulleys and a flexible element. The active pulley receives power output from the drive element and the secondary pulleys are disposed two ends of the rear section of the track. The flexible element is looped over the active pulley and the secondary pulleys to form a power transmission system.

Also, the front section of the track passes through a B-pillar of the bus. The B-pillar is cut-off to allow the track to pass through. And a stiffener is attached to the B-pillar to reinforce structural support. The stiffener may be U-shaped attached to a cut-off portion of the B-pillar.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein for illustration only, and thus is not limitative of the present invention, and wherein.

DETAILED DESCRIPTION OF THE INVENTION

Reference will now be made in detail to the present preferred embodiments of the invention, examples of which are illustrated in the accompanying drawings. Wherever possible, the same reference numbers are used in the drawings and the description refers to the same or the like parts.

Figure 1:
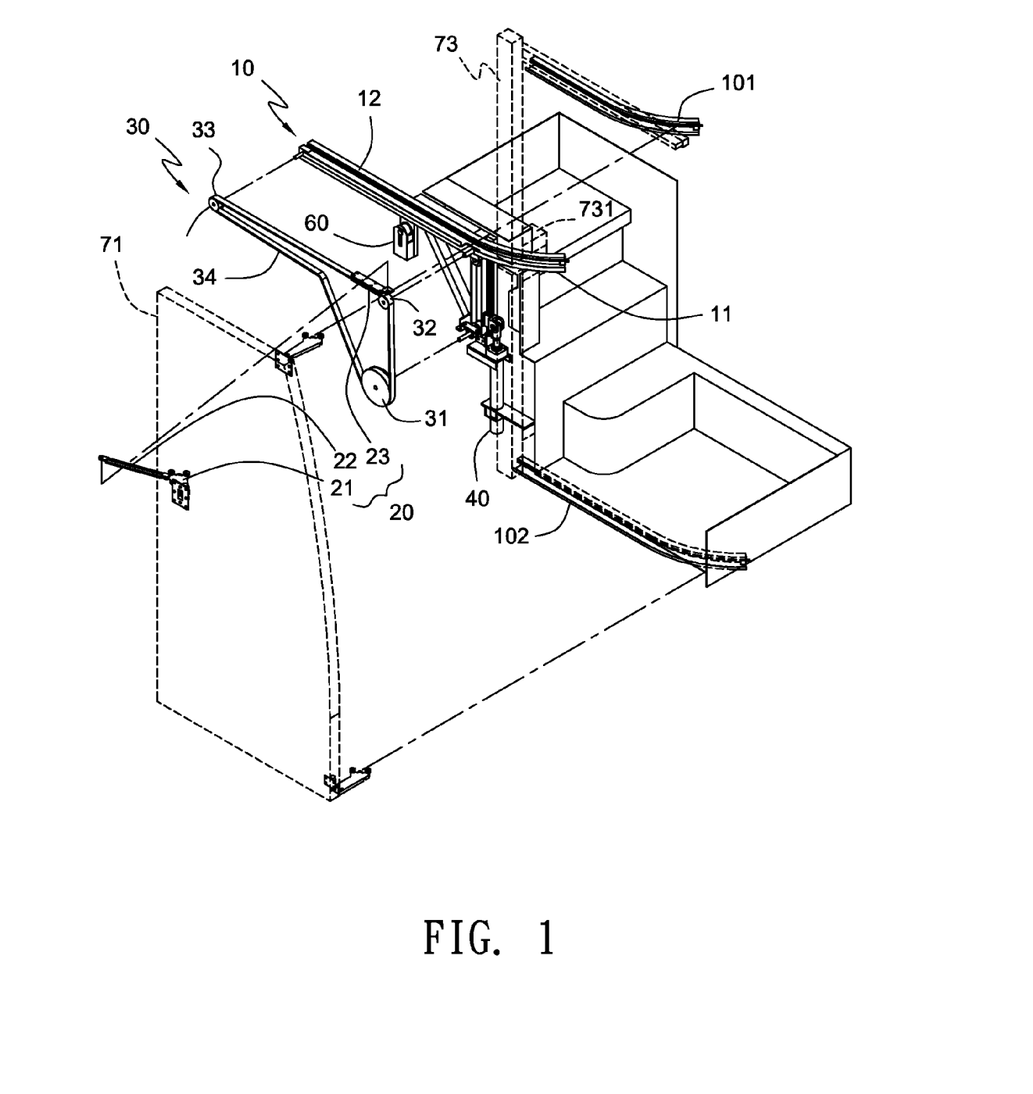
FIG. 1 is an explosive view of the door controlling mechanism in accordance with the present invention.

Please refer to FIG. 1, which is an explosive view of the door controlling mechanism in accordance with the present invention. Also, please refer to FIG. 2, which is a respective view of the door controlling mechanism in accordance with the present invention.

Figure 2:
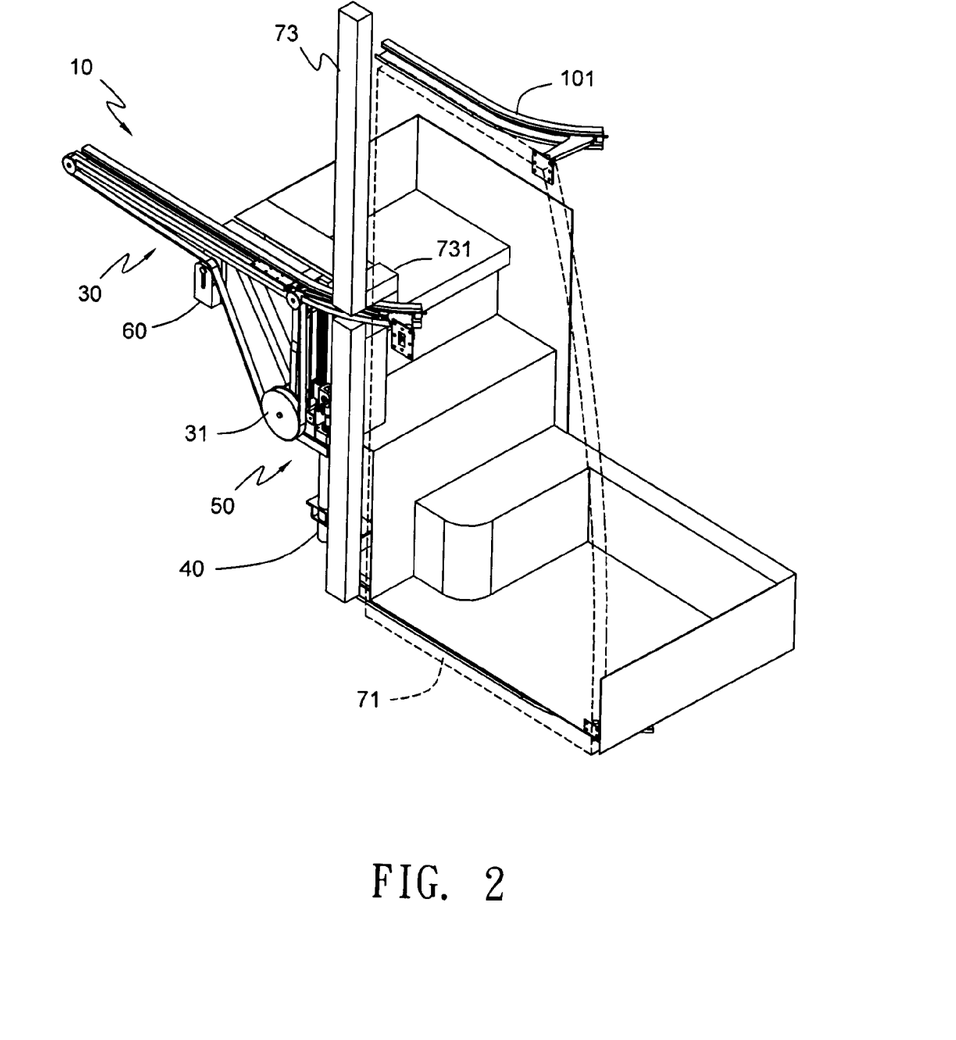
FIG. 2 is a respective view of the door controlling mechanism in accordance with the present invention.

The door controlling mechanism includes a track 10, a slider group 20, a flexible transmission group 30 and a drive element 40. The door controlling mechanism is adapted for large vehicles, such as buses 70, to control a door 71 to open/close, also refer to FIG. 5.

The track 10 is mounted on a bus body 72 of the bus 70 and near the door 71. According to related traffic rules, the door 71 protruding from the bus body 72 is not allowable. Therefore, the track 10 includes a curved front section 11 and a rear section 12 being substantially parallel to bus body 72. The front section 11 of the track 10 is bent toward to the door 71 from the bus body 72. When the door 71 is closed, the bus body 72 has smooth appearance without protrusion of the door 71 due to the curved front section 11 of the track 10. Also, the rear section 12 of the track 10 is attached and substantially parallel to bus body 72. When the door 71 is opened, the track 10 would guide the door 71 move longitudinal and along to the bus body 72 to save space-occupied caused by the conventional rotary door.

Figure 5:
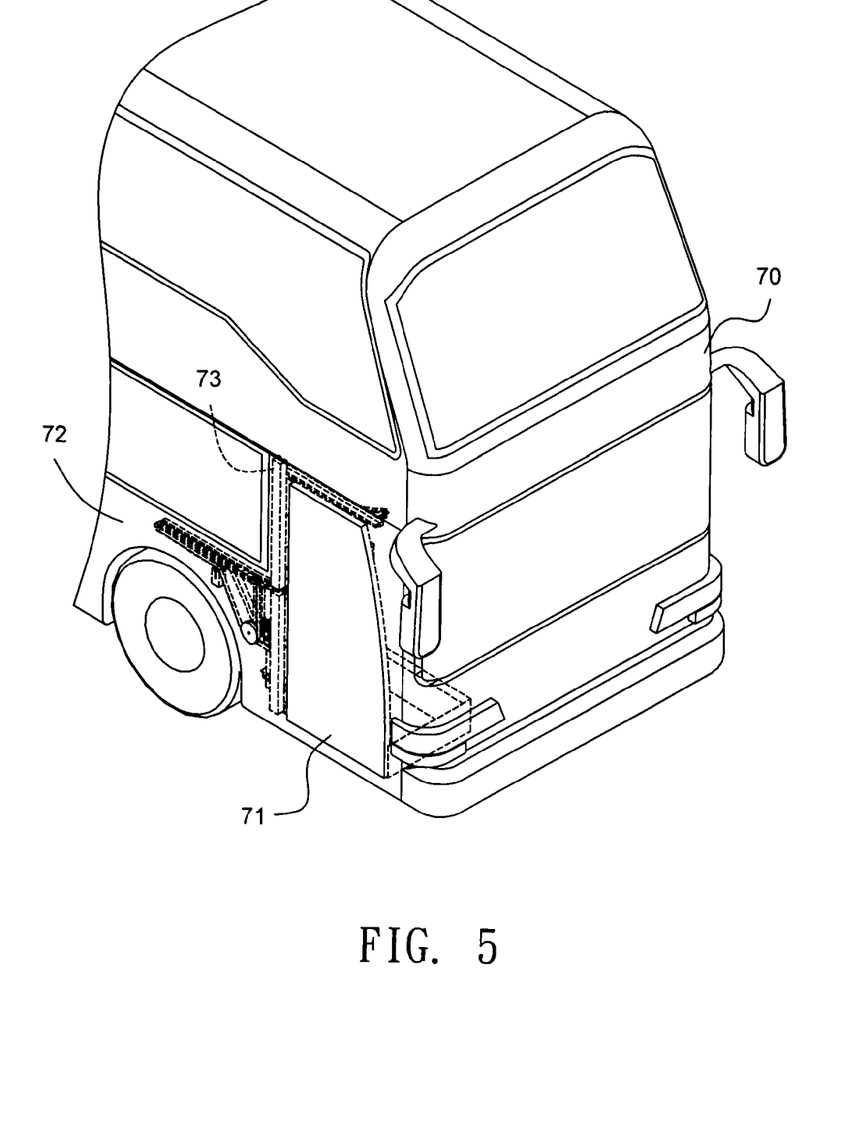
FIG. 5 is a respective view of the door controlling mechanism in accordance with the present invention which utilized to a bus.

Please refer to FIG. 5, the bus body 72 has a B-pillar 73 on the rear side of the door 71. The track 10 would be interfered with the B-pillar 73. Therefore, the B-pillar 73 is cut-off to allow the track 10 to pass through and attach. A stiffener 731 is attached to the B-pillar 73 to reinforce structural support of the B-pillar 73. The stiffener 731 is U-shaped and attached to a cut-off portion of the B-pillar 73 to connect upper portion and lower portion which are divided by the cutting.

Also, the track 10 is mounted on the bus body 72 adjacent to a middle portion of the door 71. Due to the door 71 is greatly larger than the track 10, guiding by the single one track 10 may cause the door 71 be unsteady during moving, i.e. open/close. Therefore, two auxiliary tracks 101 and 102 are mounted adjacent to a top portion and a bottom portion of the door 71 respectively. By these three tracks 10, 101 and 102 guiding, the door 71 is operated to open or close steadily.

The flexible transmission group 30 is installed to the rear section 12 of the track 10. The slider group 20 includes a fixing element 21, a connecting element 22 and a guiding element 23. The connecting element 22 is pivotally connected to the fixing element 21 and the guiding element 23. Also the fixing element 21 is connected to the door 71 and the guiding element 23 is attached to the flexible transmission group 30. By the slider group 20, the door 71 is able to slide along to the track 10.

The drive element 40 drives the flexible transmission group 30 to make the door 71 longitudinal-slide open/close through the slider group 20. The drive element may be a pneumatic cylinder, a hydraulic cylinder or a motor.

Figure 6:
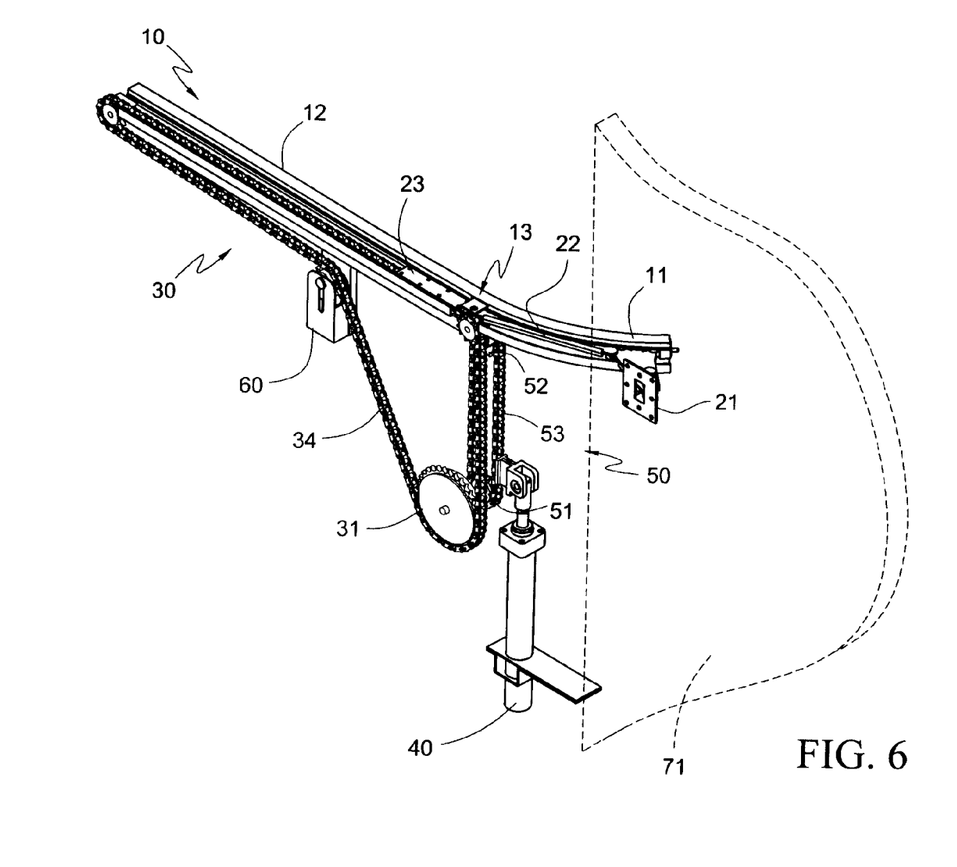
FIG. 6 is a respective view of another embodiment of the flexible element in accordance with the present invention.

The flexible transmission group 30 includes an active pulley 31, at least two secondary pulleys 32, 33 and a flexible element 34. The flexible element 34 may be a belt, see FIG. 2, or a chain, see FIG. 6. The active pulley 31 receives power output from the drive element 40 and the secondary pulleys 32, 33 are disposed two ends of the rear section 12 of the track 10. The flexible element 34 is looped over the active pulley 31 and the secondary pulleys 32, 33 to form a power transmission system. When the flexible element 34 is a belt-type, the belt mat be flat belts, round belts, Vee belts, multi-groove belts, ribbed belt, film belts or timing belts. And the pulleys 31, 32 and 33 are with corresponding type. The track 10 further includes a gap 13 between the front section 11 and the rear section 12 to allow the flexible element 34 around the pulleys 31, 32, 33 to form the power transmission system with approximate to a triangle shaped.

A driving pulley group 50 is utilized to transmit power. The driving pulley group 50 includes a driving pulley 51, a secondary pulley 52 and a flexible element 53. The flexible element 53 is looped over the driving pulley 51 and the secondary pulley 52 to form a power transmission system.

The driving pulley 51 and the active pulley 31 are homocentric, and the drive element 40 connects to the flexible element 53 to transmit power to the driving pulley group 50. Due to the homocentric relationship of the driving pulley 51 and the active pulley 31, the power is transmitted to the active pulley 31 of the flexible transmission group 30. Also, the flexible element 53 may be a belt, see FIG. 2, or a chain, see FIG. 6.

When the flexible element 34 of the flexible transmission group 30 is a belt, an adjusting element 60 is adjustable against the belt to adjust tension of the belt accordingly. The tension is bigger, the active pulley 31 and the secondary pulleys 32, 33 are driven easily without loose or slide. However, if the tension of the belt is too big, the energy consumed caused by the friction would be increased. And the belt is worn quicker.

Figure 3A:
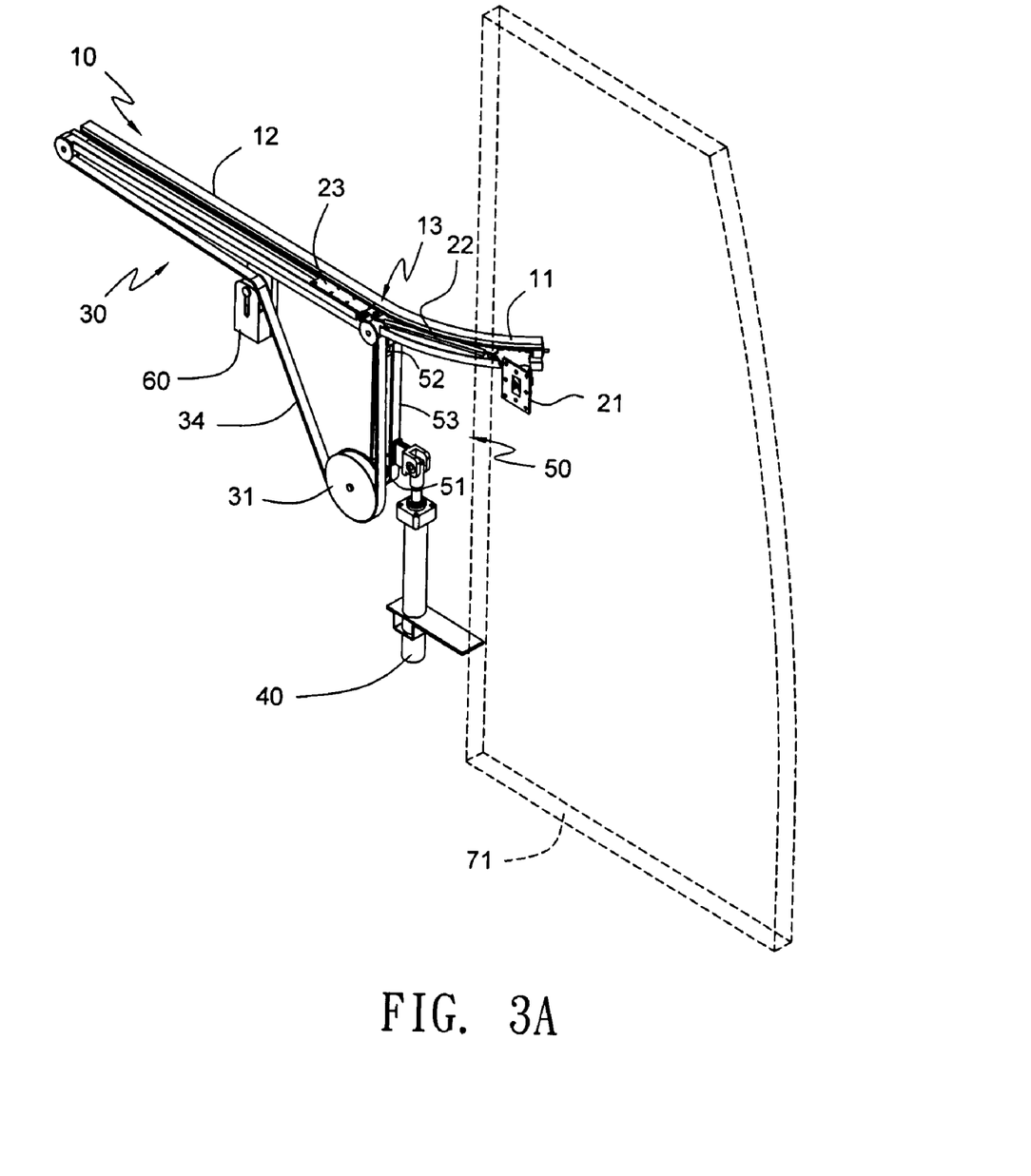
FIGS. 3A and 3B are respective views of the door controlling mechanism in accordance with the present invention showing the door is closed.
Figure 3B:
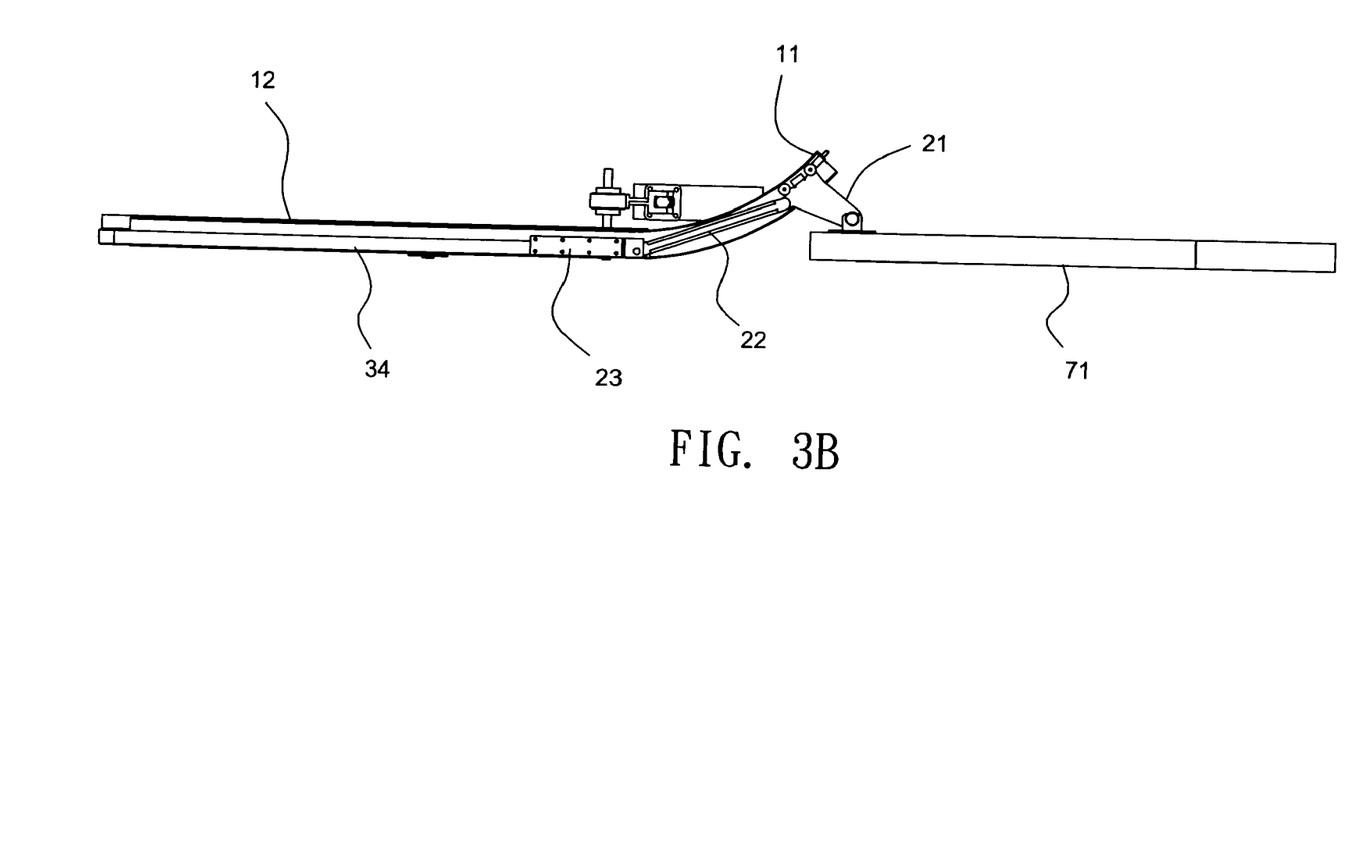

Please refer to FIGS. 3A and 3B, which are respective views of the door controlling mechanism in accordance with the present invention showing the door is closed. When the door 71 is closed, the bus body 72 has smooth appearance due to the curved front section 11 of the track 10.

Figure 4A:
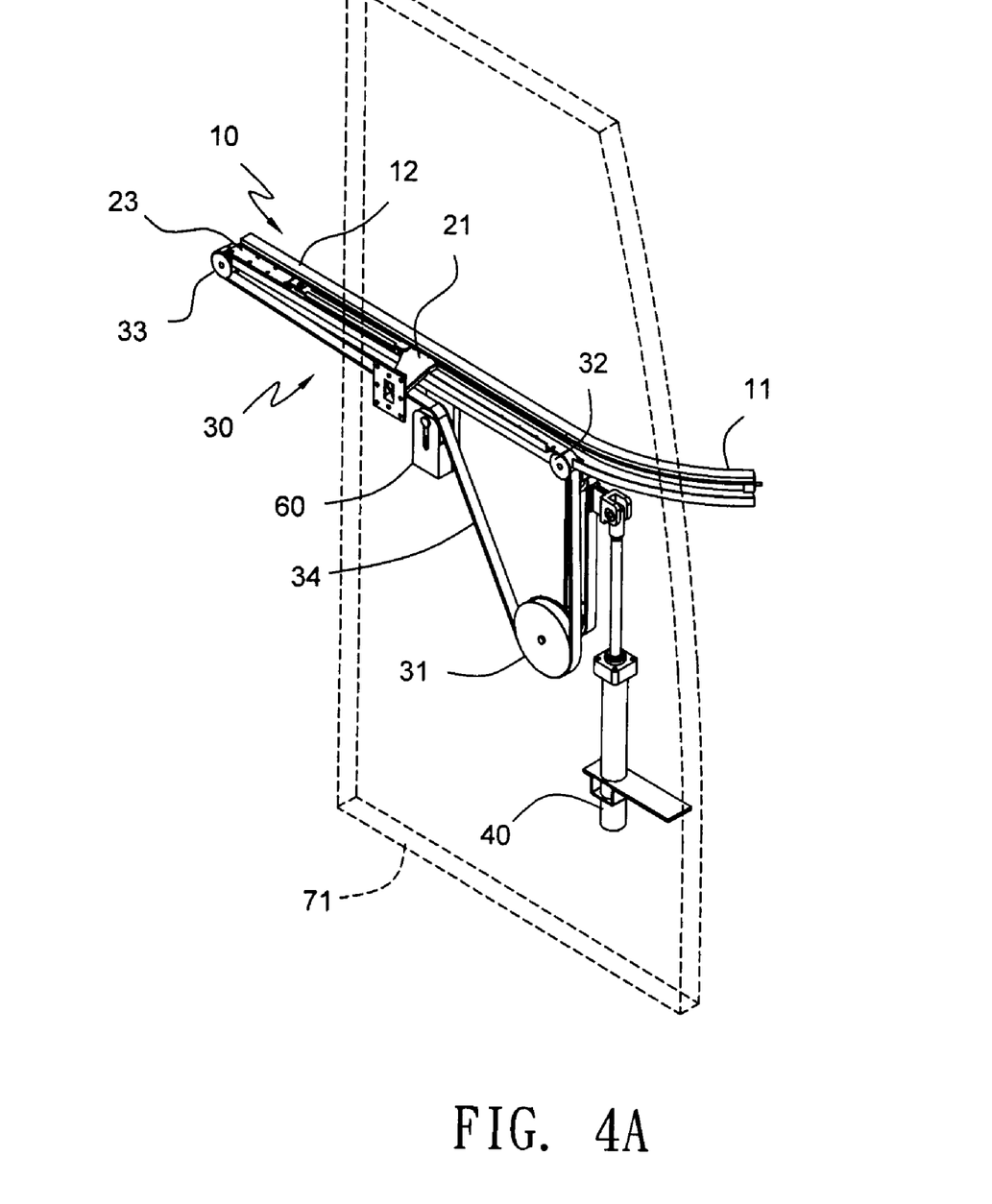
FIGS. 4A and 4B are respective views of the door controlling mechanism in accordance with the present invention showing the door is opened.
Figure 4B:
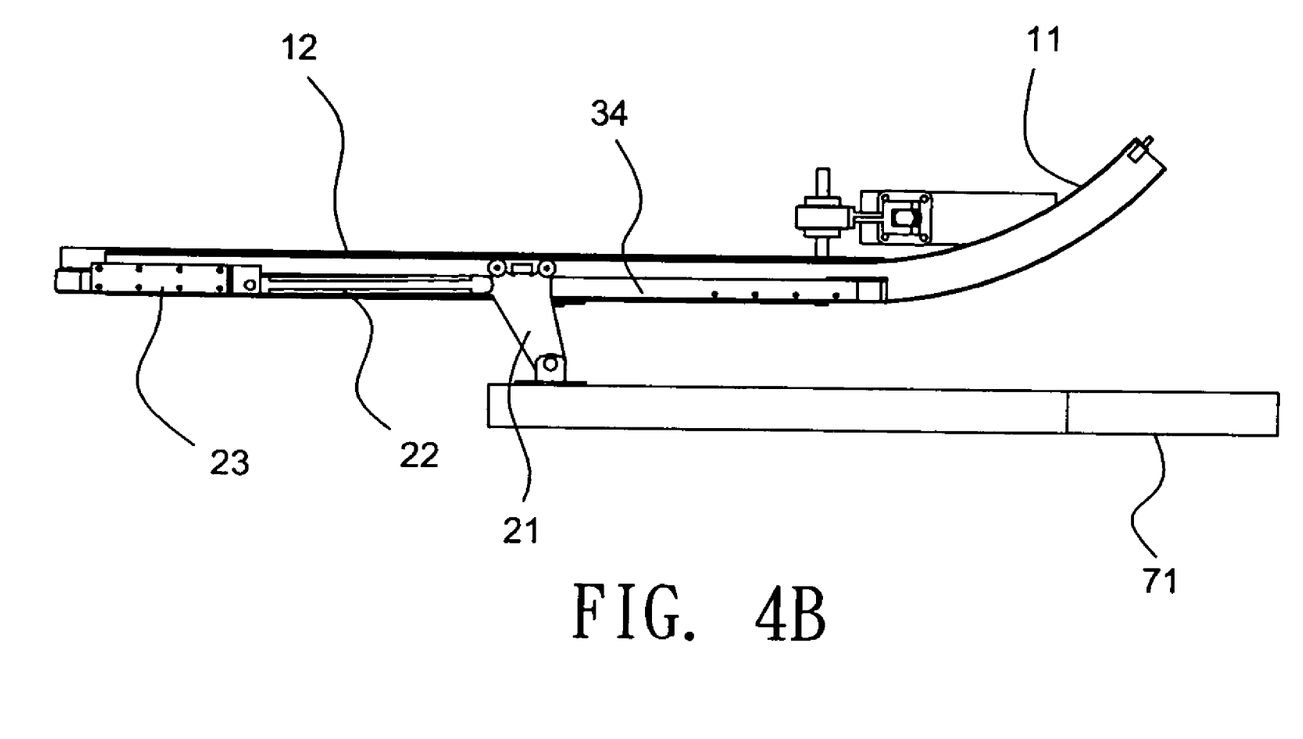

Please refer to FIGS. 4A and 4B, which are respective views of the door controlling mechanism in accordance with the present invention showing the door is opened. When operating the door controlling mechanism to control the door 71 to open, the drive element 40 drives the driving pulley group 50. The flexible element 53 moves upward and the driving pulley 51 and the secondary pulley 52 rotate counterclockwise. Due to the driving pulley 51 and the active pulley 31 are homocentric, the active pulley 31 rotates counterclockwise, too.

When the active pulley 31 rotates, the secondary pulleys 32, 33 would also be rotated counterclockwise through the flexible element 34. As shown in FIG. 4A, the flexible element 34, where locates at the rear section 12 of the track 10, is driven to move toward left side. The guiding element 23 connects to the flexible element 34 and would be moved along to the rear section 12 of the track 10 to left side. Through the connecting element 22 and the fixing element 21, the door 71 is driven to longitudinal-slide open.

The door controlling mechanism is utilized to control to open/close the door of the bus. When the door is closed, the bus body has smooth appearance, and when opening, the door is driven along to the bus body to longitudinal-slide open. Therefore, the space-occupied caused by the conventional rotary door is saved. Also, the passerby struck by the door during opening would be eliminated.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A door controlling mechanism, adapted for a door of a bus to control the door to longitudinally slide open or closed, the door controlling mechanism comprising:

a track mounted on a bus body of the bus and near the door, the track including a curved front section and a rear section being substantially parallel to a longitudinal direction of the bus;

a flexible transmission group installed on the rear section of the track;

a slider group including a fixing element, a connecting element and a guiding element, the connecting element pivotally connected to the fixing element and the guiding element, wherein the fixing element is connected to the door and the guiding element is attached to the flexible transmission group; and a drive element which drives the flexible transmission group to control the door to longitudinally slide along the track by the slider group;

wherein when the door is closed, the bus has a smooth appearance due to the curved front section of the track, and when the drive element drives the flexible transmission group to move, the slider group is moved, and the door is driven by the fixing element of the slider group.

2. The door controlling mechanism of claim 1, wherein the drive element is a pneumatic cylinder or a hydraulic cylinder.

3. The door controlling mechanism of claim 1, wherein the flexible transmission group includes an active pulley, at least two secondary pulleys and a flexible element, the active pulley receives power output from the drive element and the secondary pulleys are disposed on two ends of the rear section of the track, the flexible element is looped over the active pulley and the secondary pulleys to form a power transmission system.

4. The door controlling mechanism of claim 3, wherein the track further includes a gap between the front section and the rear section to allow the flexible element around the pulleys.

5. The door controlling mechanism of claim 3, wherein the flexible element is a belt or a chain.

6. The door controlling mechanism of claim 3, further comprises a driving pulley group including a driving pulley, a secondary pulley and a flexible element, the flexible element is looped over the driving pulley and the secondary pulley to form a power transmission system, the driving pulley and the active pulley are homocentric, and the drive element connects to the flexible element to transmit power to the driving pulley group and to the active pulley of the flexible transmission group.

7. The door controlling mechanism of claim 6, wherein the flexible element is a belt or a chain.

8. The door controlling mechanism of claim 3, wherein the guiding element of the slider group is connected to the flexible element.

9. The door controlling mechanism of claim 3, further comprises an adjusting element and the flexible element is a belt, the adjusting element is adjustable against the belt to adjust tension of the belt accordingly.

10. The door controlling mechanism of claim 1, wherein the track is mounted on the bus body adjacent to a middle portion of the door.

11. The door controlling mechanism of claim 10, further comprises two auxiliary tracks, mounted adjacent to a top portion and a bottom portion of the door respectively.

12. The door controlling mechanism of claim 1, wherein the front section of the track passes through a B-pillar of the bus.

13. The door controlling mechanism of claim 12, wherein the B-pillar is cut-off to allow the track to pass through.

14. The door controlling mechanism of claim 13, further comprises a stiffener, attached to the B-pillar, to reinforce structural support.

15. The door controlling mechanism of claim 14, wherein the stiffener is U-shaped attached to a cut-off portion of the B-pillar.

* * * * *